(12) United States Patent
Faulk et al.

(10) Patent No.: US 7,393,174 B2
(45) Date of Patent: Jul. 1, 2008

(54) FIELD COIL HANDLING CART AND TRANSFER METHOD

(75) Inventors: Bruce Allen Faulk, Duluth, GA (US); James Thaddeus Henley, Saratoga Springs, NY (US); Garth Townsend, Kaufman, TX (US)

(73) Assignee: General Electric Company, Schenectady, NY (US)

( * ) Notice: Subject to any disclaimer, the term of this patent is extended or adjusted under 35 U.S.C. 154(b) by 565 days.

(21) Appl. No.: 10/900,183

(22) Filed: Jul. 28, 2004

(65) Prior Publication Data

US 2006/0045690 A1 Mar. 2, 2006

(51) Int. Cl.
*B21C 47/24* (2006.01)

(52) U.S. Cl. ............... 414/331.06; 414/809; 242/363

(58) Field of Classification Search ............ 414/331.06, 414/331.14, 373, 391, 392, 608, 684, 467; 280/79.3, 79.6; 242/403.1, 363, 388.9, 398, 242/595, 577, 575, 129, 404.3; 226/118.2; 60/905; 211/206, 187; 336/DIG. 2, 199, 336/207, 15, 142, 68; 134/14

See application file for complete search history.

(56) References Cited

U.S. PATENT DOCUMENTS

| | | | |
|---|---|---|---|
| 618,396 A * | 1/1899 | Cowles ........................... 72/39 |
| 627,723 A * | 6/1899 | Edwards ..................... 242/363 |
| 1,730,777 A * | 10/1929 | Mayer ........................ 280/144 |
| 2,539,809 A * | 1/1951 | Buckley .................... 211/59.4 |
| 2,789,778 A * | 4/1957 | Zogg et al. ............... 242/423.1 |
| 2,863,615 A * | 12/1958 | Kenmore et al. ............ 242/362 |
| 2,911,996 A * | 11/1959 | Kollmann .............. 137/355.12 |
| 2,949,250 A * | 8/1960 | Manson ...................... 242/363 |
| 2,994,490 A * | 8/1961 | Manson ...................... 242/363 |
| 3,021,011 A * | 2/1962 | Visneski ..................... 211/49.1 |
| 3,072,358 A * | 1/1963 | Knapp ........................ 242/129 |
| 3,157,424 A * | 11/1964 | Hall ........................... 294/68.3 |
| 3,173,556 A * | 3/1965 | Gaudriot et al. ............. 414/608 |
| 3,731,886 A * | 5/1973 | Macchi ....................... 242/602 |
| 3,776,437 A * | 12/1973 | Carney ....................... 224/406 |
| 3,902,678 A * | 9/1975 | Lussie et al. ................ 242/127 |
| 4,360,298 A * | 11/1982 | Fischer et al. ................. 410/32 |
| 4,410,121 A * | 10/1983 | Wheeler et al. .......... 242/364.1 |
| 4,456,189 A * | 6/1984 | Wheeler et al. .......... 242/364.1 |
| 4,529,140 A * | 7/1985 | Cooper et al. ............ 242/364.1 |
| 4,567,649 A | 2/1986 | Ades et al. |
| 4,590,653 A | 5/1986 | Ades et al. |
| 4,635,336 A | 1/1987 | Ades et al. |
| 4,949,909 A * | 8/1990 | Hatfield ...................... 242/557 |
| 5,025,999 A * | 6/1991 | Littrell ....................... 242/577 |
| 5,280,933 A * | 1/1994 | Finneyfrock ............. 280/47.34 |
| 5,599,031 A * | 2/1997 | Hodges ................... 280/79.11 |
| 5,743,413 A * | 4/1998 | Noll ........................... 211/60.1 |
| 5,893,468 A * | 4/1999 | Holmes ...................... 211/60.1 |
| 6,116,533 A * | 9/2000 | Elder ....................... 242/594.4 |

(Continued)

*Primary Examiner*—Saul J. Rodriguez
*Assistant Examiner*—Charles Greenhut
(74) *Attorney, Agent, or Firm*—Nixon & Vanderhye PC

(57) ABSTRACT

A modified cart and coil hanger assembly wherein vertical support assemblies are provided to receive the coil turns for lifting and transport to and from the field and which are selectively locked to a coil cart main body for ground transport. As such, the assembly of the invention provides the advantages of a fully mobile coil cart including the ability to manage floor lay down space in the field rewind area as well as coil hanging and overhead transport as required for field rewind.

7 Claims, 4 Drawing Sheets

U.S. PATENT DOCUMENTS

| | | | |
|---|---|---|---|
| 6,270,299 B1 * | 8/2001 | Rehbein | 410/41 |
| 6,457,619 B1 * | 10/2002 | Werner et al. | 224/405 |
| 6,468,016 B1 * | 10/2002 | Roman | 414/331.06 |
| 6,471,075 B2 * | 10/2002 | Robichaux | 211/70.4 |
| 6,523,776 B1 * | 2/2003 | Elder | 242/594.4 |
| 6,561,366 B2 * | 5/2003 | Kim-So | 211/189 |
| 6,591,988 B2 * | 7/2003 | Trpkovski | 206/454 |
| 6,619,578 B2 | 9/2003 | Stockman et al. | |
| 6,655,627 B2 * | 12/2003 | Patton | 242/397.2 |
| 6,669,037 B1 * | 12/2003 | Ahn | 211/189 |
| 6,935,523 B2 * | 8/2005 | Ahn | 211/195 |

* cited by examiner

FIELD COIL HANDLING CART AND TRANSFER METHOD

BACKGROUND OF THE INVENTION

The present invention relates to generator repair technology and, more particularly, to integrated tooling for field rewinds.

Referring to FIG. 1, it has been conventional practice to reuse original manufacture copper coils by transferring the existing coil 10, one turn at a time, into a coil hanger component 12. After all copper turns are supported by coil hangers, the coil is ready for transfer. The entire coil can be lifted and transferred, as shown by arrow T, into an area overlying a coil cart 14. The copper turns of the coil are then transferred to the coil cart one at a time. The process is reversed to transfer the coil to the field 16.

BRIEF DESCRIPTION OF THE INVENTION

The present invention improves upon the above-described conventional practice by providing a dual purpose coil handling component that defines both a coil hanger assembly and a coil cart assembly so that coils can be supported while suspended from overhead and then locked into a rolling cart device, thereby eliminating the man hours required to shift copper coils from a conventional rolling coil handling cart to a conventional coil hanging device, thereby improving the productivity.

Thus, the invention may be embodied in a field coil handling cart assembly comprising: a cart main body including wheels for selective transport; and a plurality of vertical support assemblies, each said vertical support assembly having a first, vertically lower end constructed and arranged for detachable coupling to a complimentary coupling provided on said cart main body and a lift assembly provided at a second, vertically upper end thereof for selective coupling to a lifting device.

The invention may also be embodied in a method for transferring a field coil to a field, comprising: providing a coil handling cart assembly including a cart main body including wheels for selective transport; and a plurality of vertical support assemblies, each said vertical support assembly having a first, vertically lower end constructed and arranged for detachable coupling to a complimentary coupling provided on said cart main body and a lift assembly provided at a second, vertically upper end thereof; disposing a coil having a plurality of turns so that it is supported by said plurality of vertical support assemblies; transporting said cart assembly to be disposed below a lifting device; coupling said second, vertically upper end of each said vertical support assembly to said lifting device; detaching said first, vertically lower end of each said vertical support assembly from said cart main body; lifting said vertical support assemblies with said lifting device so as to lift said coil supported thereby; suspending said vertical support assemblies above a field structure; and disposing said coil, turn by turn, in respective slots of said field.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

The invention provides a modified cart and coil hanger assembly wherein vertical support assemblies 20 are provided to receive the coil turns 10 for lifting and transport to and from the field 16 and which are selectively locked to a coil cart main body 22 for ground transport. As such, the assembly of the invention provides the advantages of a fully mobile coil cart including the ability to manage floor lay down space in the field rewind area as well as coil hanging and overhead transport as required for field rewind.

Figure 1:
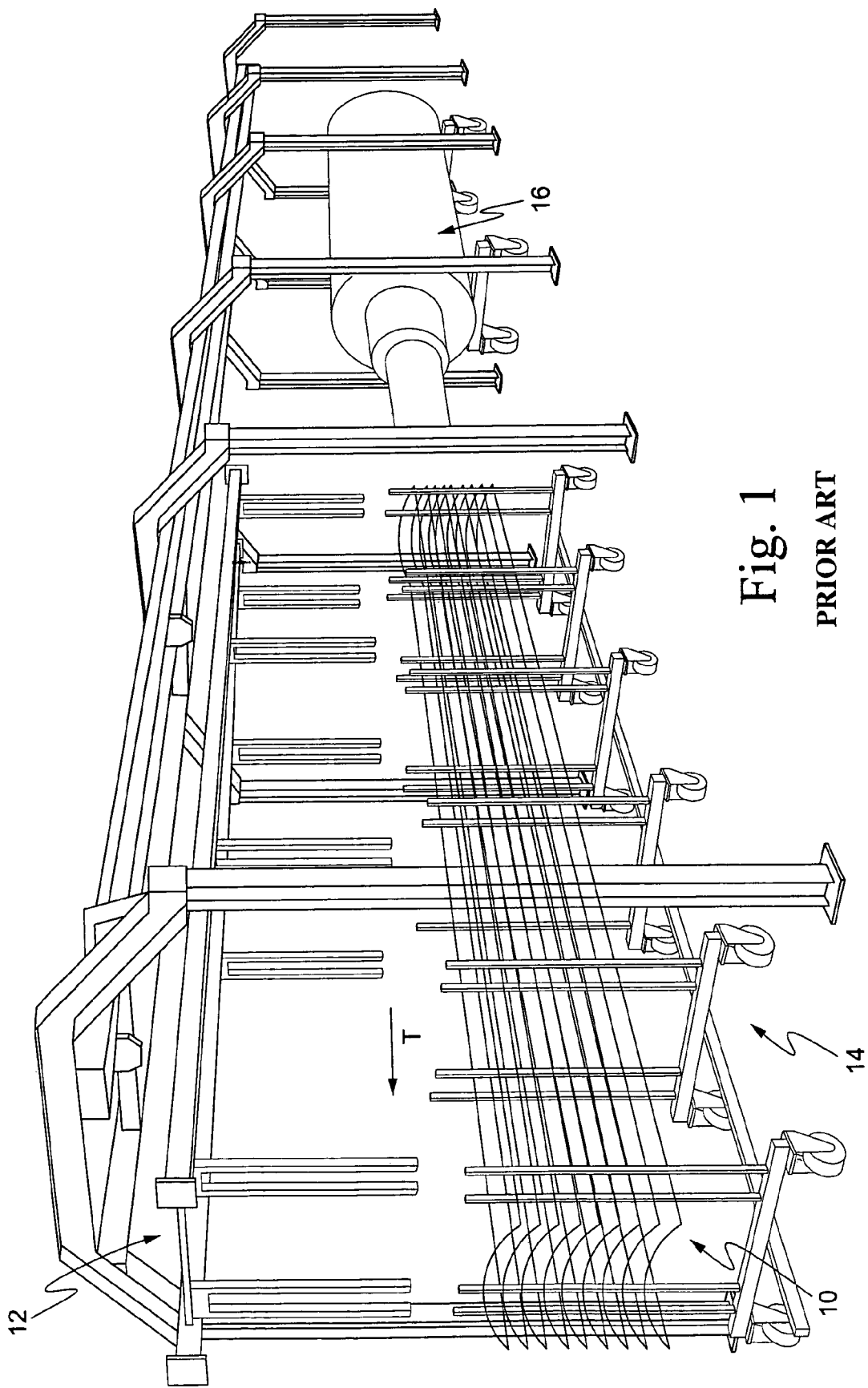
FIG. 1 is a schematic perspective view illustrating components of a conventional field coil handling system.
Figure 2:
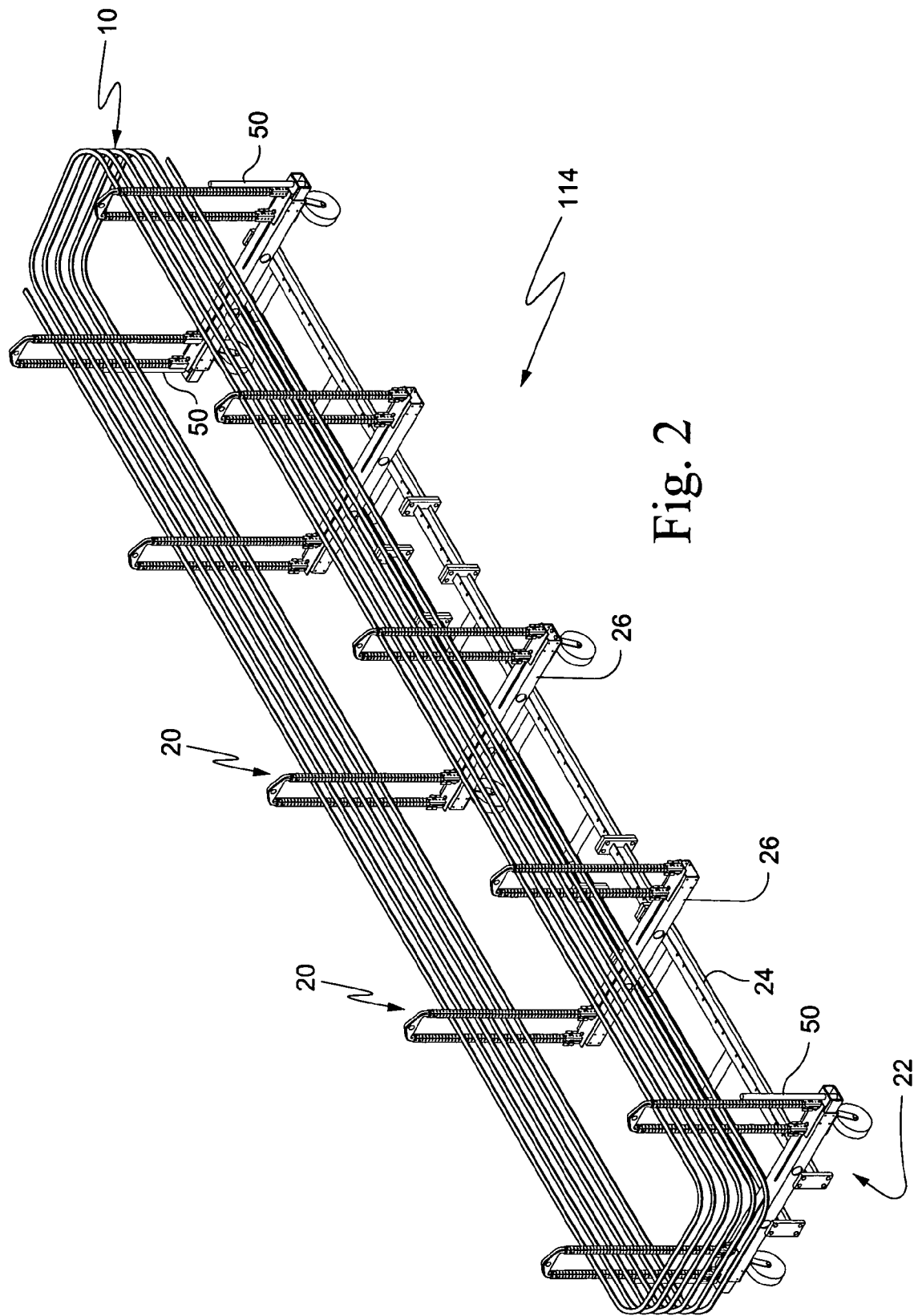
FIG. 2 is a schematic perspective view of a field coil handling cart embodying the invention and supporting a coil.

FIG. 2 illustrates an assembly embodying the invention in the mobile coil cart configuration. The field coil handling cart 114 includes a cart main body 22 which is comprised of a longitudinal frame 24, in the illustrated embodiment a ladder frame structure. In the illustrated embodiment, the cart main body also includes a plurality of transverse frame components 26 each of which is secured to the longitudinal frame 24. The transverse frame components are provided to each detachably receive a pair of vertical support assemblies 20. As will be appreciated, to accommodate the coil turns, the lateral spacing of the vertical coil support assemblies 20 is advantageously adjustable, as described in greater detail below.

Figure 3:
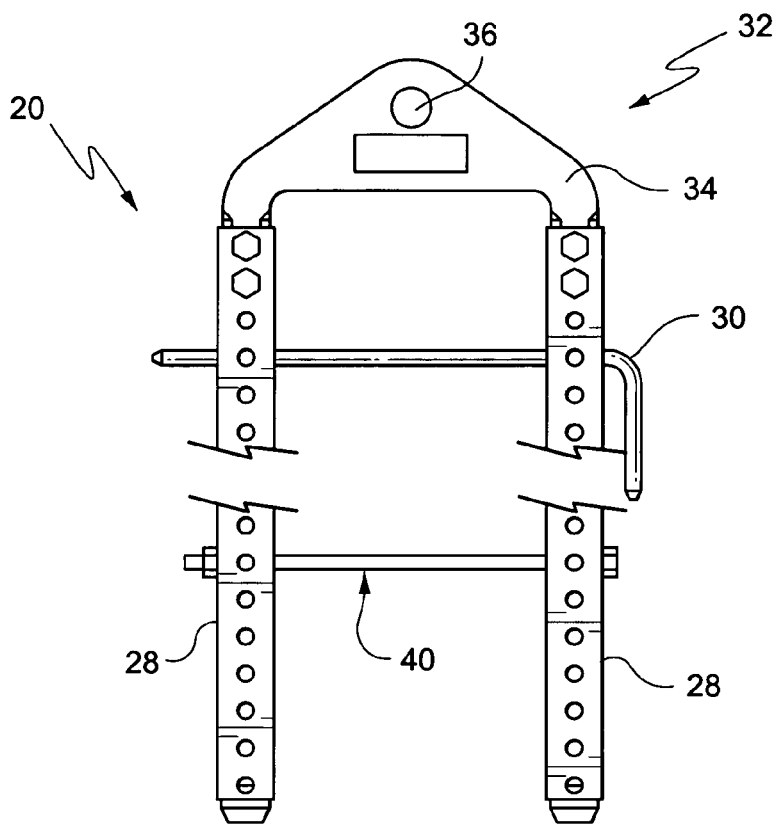
FIG. 3 is a schematic elevational view of a vertical support assembly embodying the invention.

Referring to the schematic illustration of FIG. 3, a vertical support assembly 20 embodying the invention is illustrated by way of example. In the illustrated embodiment, the vertical support assembly includes first and second vertical support members 28 for supporting each of a plurality of turns of the coil. To support each of the turns of the coil, a support pin element 30 is disposed to extend between the first and second vertical support members. In the illustrated embodiment, each support pin 30 is generally L-shaped and is inserted through horizontally aligned holes to define a support surface for a respective coil turn. Although only a single coil pin is illustrated in detail in FIG. 3, it is understood that support pin elements 30 are provided for each turn of the copper coil.

The upper end of the vertical support assembly comprises a lift assembly 32 including a hanger component 34, which is detachably secured to the upper end of each of the vertical support members 28. Although in the illustrated embodiment, the hanger component is detachably secured, and it is to be understood that a permanent attachment, such as a weld, may be provided as an alternative. The hanger component of the lift assembly includes a suitable receptacle, schematically depicted at 36, for detachably coupling the hanger component to a lift device for lifting and transporting the vertical support assemblies 30 and the coil 10 supported thereby.

The lower end of the vertical support assembly is configured for detachable coupling to the cart main body 22. In the illustrated embodiment, as discussed more particularly below, the lower ends of the vertical support members are configured for receipt in corresponding receptacles 38 of the cart main body. Further, in the illustrated embodiment, a stabilizing bolt 40 is detachably secured to extend between the vertical support members 28. The stabilizing bolt 40 is provided to determine the spacing of the vertical support members to ensure alignment with the respective receptacles of the cart main body and to prevent separation of the support members 28 during overhead transport as described below. The stabilizing bolts (and nuts) are merely one example of an assembly that can be provided to determine the lateral spacing of the lower end of the vertical support assembly 20. As presently proposed, the support pins 30 but not the stabilizing bolts 40 are disposed to receive and support the coil turns. In an exemplary embodiment, the cart capacity is about 4,000 pounds, with 500 pounds to be supported by each vertical support assembly, and each support pin adapted to support about 100 pounds.

Figure 4:
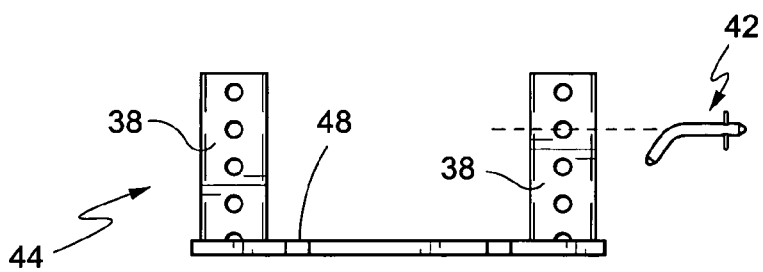
FIG. 4 is a schematic elevational view of a receptacle for receiving a lower end of a vertical support assembly.
Figure 5:
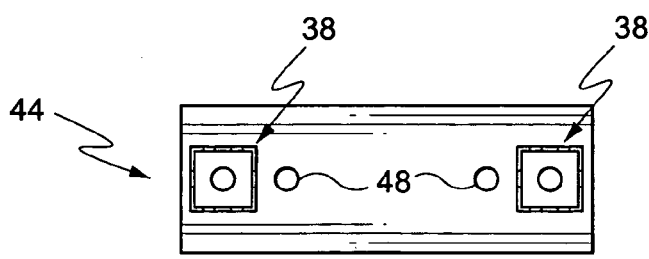
FIG. 5 is a plan view of the receptacle illustrated in FIG. 4.
Figure 6:
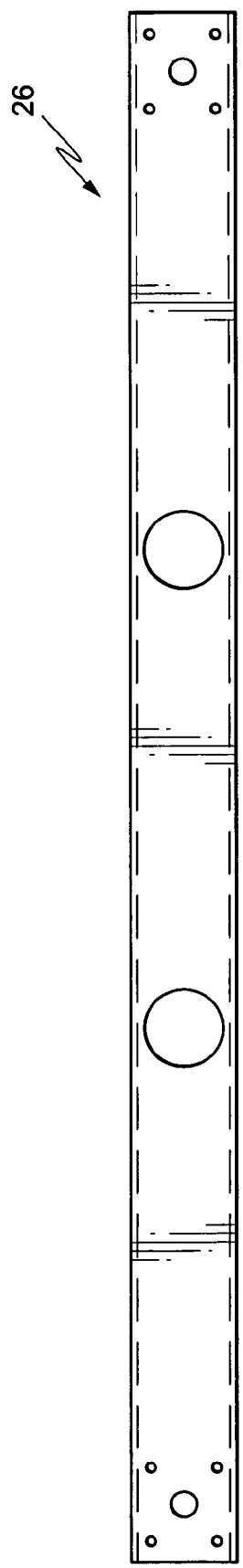
FIG. 6 is an elevational view of a transverse frame component in an exemplary embodiment of the invention.
Figure 7:
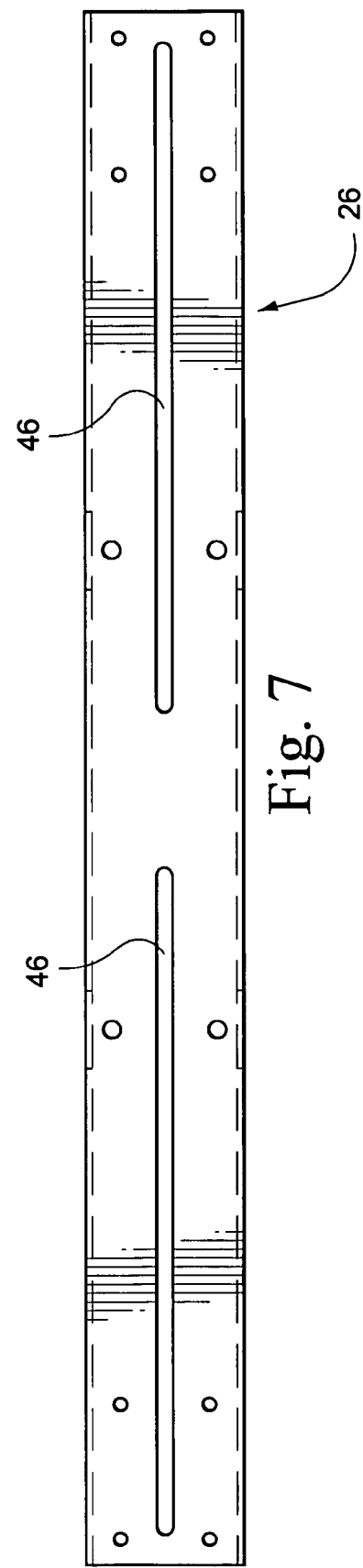
FIG. 7 is a plan view of the transverse frame component illustrated in FIG. 6.

As mentioned above, in the illustrated embodiment each vertical support assembly 20 is detachably coupled to a corresponding coupling of the cart main body. In the illustrated embodiment, the corresponding coupling of the cart main body comprises first and second receptacles 38 for respectively receiving the first and second vertical support members of the respective vertical support assembly. Thus, in the illustrated embodiment, first and second receptacles are provided having a shape generally corresponding to the cross-sectional shape of each vertical support member 28. As illustrated in the exploded view of FIG. 4, locking pin(s) 42 are provided to engage horizontally aligned holes in the receptacles 38 and vertical support members 28, respectively, to facilitate rapid locking attachment of the vertical support assembly to the receptacle. In the illustrated embodiment, holes for the locking pin(s) are provided both in the front/rear faces of the receptacle and vertical support member and in the side faces thereof so that the components can be locked from the front/rear or from the side. In an exemplary embodiment, first and second locking pins are associated with each receptacle 38.

As mentioned above, the lateral spacing or width of the turns of the coil will vary and, therefore, in an exemplary embodiment of the invention, the lateral spacing of respective pairs of vertical support assemblies 20 can be adjusted to accommodate a particular coil. In the illustrated embodiment, the lateral adjustment of the vertical support assembly is accommodated by providing the receptacles 38 in paired assemblies 44 slidably disposed in lateral adjustment slots 46 provided in the transverse frame component. Thus, the receptacle assembly 44 is detachably secured to the transverse frame component 26 by means of, e.g., first and second nuts/bolts disposed through holes 48 and through the corresponding lateral adjustment slot 46. By tightening the bolt/nuts to secure the assembly 44 in place, the lateral spacing between a pair of vertical supports 28 can be adjusted to accommodate the dimension of the respective coil to be received and transported.

For rewinding a field, a fully mobile coil cart 114 as schematically illustrated in FIG. 2 is axially aligned with the target field with the turns of the coil disposed and supported on the support pins of each the vertical support assembly. A handle 50 is advantageously attached to the longitudinal end of preferably each transverse frame component disposed at each end of the longitudinal frame member to easily guide and direct the cart into position. When the coil is to be transferred to the field, the hanger components of the respective vertical support assemblies are each secured to the lift device (not shown in FIG. 2). The locking pins of each of the receptacles of the cart main body are then disengaged so that the vertical support assemblies can each be disengaged from the cart main body when the lift device is actuated to vertically displace the vertical support assemblies. Because the turns of the coil are respectively supported by the support pins disposed to extend between the vertical support members of the vertical support assemblies, when the vertical support assemblies are lifted by the lift assembly, the vertical support assemblies will lift and transport the supported coil to the field.

To dispose the coil in the field, the vertically lowermost support pins of the vertical support assembly are disengaged, for example, along one side of the supported coil and once the coil turn has been disposed in position, the lowermost support pins on the opposite lateral side are disengaged for the remainder of the first coil turn to be disposed in position in the field. It is to be understood that before the coil turns are released from the vertical support assemblies, the stabilizing bolts and nuts are respectively disengaged from the vertical support members to allow the coil turns to be vertically released from the vertical support assembly. Once each of the coil turns of the coil are in turn released from the vertical support assemblies by disengaging the respective support pins, the stabilizing bolts and nuts can be reattached and the vertical support assemblies can be re-engaged with the cart main body. It is to be understood that if deemed necessary or desirable the stabilizing bolts and nuts can be removed at any time before application of the coil to the field but in the interest of stably maintaining the vertical support members, it is advantageous for the support bolts to be removed as a final step before removal of the coil pins. In this regard, the stabilizing bolts provide added safety by ensuring the vertical supports do not separate while the hangers/coils are being moved overhead by cranes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A field coil handling cart comprising:
   a cart main body;
   a plurality of vertical support assemblies, each said vertical support assembly having a first, vertically lower end constructed and arranged for detachable coupling to complimentary coupling components provided on said cart main body and a lift assembly provided at a second, vertically upper end thereof for selective coupling to a lifting device,
   wherein each said vertical support assembly comprises first and second vertical support members and wherein a plurality of support pin elements are detachably secured to extend between said vertical support members to define respective support surfaces for engaging and supporting respective coil turns of the field coil.

2. A method for transferring a field coil to a field, comprising:
   providing a coil handling cart assembly including a cart main body including wheels for selective transport, and a plurality of vertical support assemblies, each said vertical support assembly having a first, vertically lower end constructed and arranged for detachable coupling to a complimentary coupling components provided on said cart main body and a lift assembly provided at a second, vertically upper end thereof;
   disposing a coil having a plurality of turns so that it is supported by said plurality of vertical support assemblies;
   transporting said cart assembly to be disposed below a lifting device;

coupling said second, vertically upper end of each said vertical support assembly to said lifting device;

detaching said first, vertically lower end of each said vertical support assembly from said cart main body;

lifting said vertical support assemblies with said lifting device so as to lift said coil supported thereby;

suspending said vertical support assemblies above a field structure; and disposing said coil, turn by turn, in respective slots of said field.

3. A method as in claim 2, wherein said cart main body comprises a longitudinal frame and a plurality of transverse frame components, said coupling components of said cart main body being one of secured to and defined by said transverse frame components, and wherein first and second coupling components for coupling to respective vertical support assemblies are provided on each said transverse frame component so that each said transverse frame component is detachably secured to first and second vertical support assemblies.

4. A method as in claim 2, wherein said coupling components comprise receptacles for receiving said respective vertical support assemblies, and wherein said method further comprises inserting a locking pin through aligned openings of said receptacles and said vertical support assemblies received therein to lock said vertical support assemblies to said cart main body.

5. A method as in claim 4, wherein at least some of said coupling components are slidably coupled to said cart main body, whereby a spacing between said vertical support assemblies can be varied according to coil turn size.

6. A method as in claim 4, wherein each said vertical support assembly comprises first and second vertical support members and further comprising disposing a plurality of support pin elements to extend between said vertical support members, each to define a respective support surface for engaging and supporting a respective coil turn.

7. A method as in claim 6, wherein said support pin elements are successively removed to dispose said coil, turn by turn, in respective slots of said field.

\* \* \* \* \*